(12) United States Patent
Jessup et al.

(10) Patent No.: US 10,625,708 B2
(45) Date of Patent: Apr. 21, 2020

(54) ENERGY ABSORBING RESTRAINT WEB ASSEMBLY INCLUDING A VISUAL DEPLOYMENT INDICATOR

(71) Applicant: INDIANA MILLS & MANUFACTURING, INC., Westfield, IN (US)

(72) Inventors: Chris P. Jessup, Sheridan, IN (US); Jeffrey A. King, Markleville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 85 days.

(21) Appl. No.: 15/770,662

(22) PCT Filed: Nov. 11, 2016

(86) PCT No.: PCT/US2016/061474
§ 371 (c)(1),
(2) Date: Apr. 24, 2018

(87) PCT Pub. No.: WO2017/083607
PCT Pub. Date: May 18, 2017

(65) Prior Publication Data
US 2018/0312134 A1    Nov. 1, 2018

Related U.S. Application Data

(60) Provisional application No. 62/253,929, filed on Nov. 11, 2015.

(51) Int. Cl.
| | | |
|---|---|---|
| *B60R 22/16* | (2006.01) | |
| *B60R 22/00* | (2006.01) | |
| *B60R 22/28* | (2006.01) | |

(52) U.S. Cl.
CPC ........ *B60R 22/16* (2013.01); *B60R 2022/006* (2013.01); *B60R 2022/286* (2013.01)

(58) Field of Classification Search
CPC .......................... B60R 22/16; B60R 2022/286
See application file for complete search history.

(56) References Cited

U.S. PATENT DOCUMENTS 3,550,957 A * 12/1970 Booth ..................... B60R 22/16
  297/472
3,561,819 A * 2/1971 Renneker ................ B60R 22/28
  297/472

(Continued)

FOREIGN PATENT DOCUMENTS

WO         87-00064         1/1987

OTHER PUBLICATIONS

PCT International Search Report for PCT/US2016/061474, dated Mar. 2, 2017, 14 pages.

*Primary Examiner* — Paul N Dickson
*Assistant Examiner* — Joselynn Y Sliteris
(74) *Attorney, Agent, or Firm* — Barnes & Thornburg, LLC

(57) ABSTRACT

An energy-absorbing restraint web assembly may include a motor vehicle seat restraint web and an energy absorption web having a first length, a first end attached to the restraint web at a first location thereof and a second end, opposite the first end of the energy absorption web, attached to the restraint web at a second location thereof, the energy absorption web responsive to a transverse force applied to the restraint web between first and second ends thereof that is greater than a threshold force to elongate and absorb energy while elongating, wherein the restraint web defines a second length between the first and second locations thereof, the second length of the restraint web greater than the first length of the energy absorption web such that the overall length of the restraint web increases as the energy absorption web elongates.

12 Claims, 9 Drawing Sheets

(56) References Cited

U.S. PATENT DOCUMENTS

| | | | |
|---|---|---|---|
| 3,861,744 A * | 1/1975 | Yamada | B60R 22/16 297/472 |
| 4,138,157 A | 2/1979 | Pickett et al. | |
| 4,387,911 A * | 6/1983 | Takada | B60R 22/16 280/802 |
| 4,958,853 A | 9/1990 | Doty | |
| 5,050,906 A * | 9/1991 | Kneip | B60R 22/16 280/801.1 |
| 5,113,981 A * | 5/1992 | Lantz | F16F 7/006 182/3 |
| 6,533,066 B1 | 3/2003 | O'Dell | |
| 2008/0072404 A1 | 3/2008 | Wetter | |
| 2012/0001460 A1 | 1/2012 | Ruthinowski et al. | |

* cited by examiner

ENERGY ABSORBING RESTRAINT WEB ASSEMBLY INCLUDING A VISUAL DEPLOYMENT INDICATOR

CROSS REFERENCE TO RELATED APPLICATIONS

This application is the U.S. national phase of PCT/US2016/061474 filed Nov. 11, 2016. PCT/US2016/061474 claims the benefit of and priority to U.S. provisional patent application Ser. No. 62/253,929 filed Nov. 11, 2015, the disclosure of which is expressly incorporated herein by reference.

FIELD OF THE INVENTION

The present invention relates generally to restraint systems for motor vehicles, and more specifically to such restraint systems including at least one energy absorbing web assembly which may include a visual deployment indicator.

BACKGROUND

Motor vehicle restraint systems are known which include one or more load reducing webs. In some such restraint systems, a portion of an existing restraint web is looped upon itself and affixed via stitching or adhesive. When the restraint web is subject to a sufficient amount of force under load, the loops release, i.e., break apart, and the restraint web thus becomes longer and thereby transfers less load to the occupant than would otherwise be transferred with the shorter restraint web.

SUMMARY

The present invention may comprise one or more of the features recited in the attached claims, and/or one or more of the following features and combinations thereof. In one aspect, an energy-absorbing restraint web assembly may comprise a restraint web having a first end configured for attachment to at least one of a motor vehicle seat, a motor vehicle frame component, a motor vehicle floor and a web retractor secured within a motor vehicle, and a second end opposite the first end and configured for attachment to at least one of another restraint web and a releasable attachment device, and an energy absorption web having a first length, a first end attached to the restraint web at a first location thereof and a second end, opposite the first end of the energy absorption web, attached to the restraint web at a second location thereof, the energy absorption web responsive to a transverse force applied to the restraint web between the first and second ends thereof that is greater than a threshold force to elongate and absorb energy while elongating, wherein the restraint web defines a second length between the first and second locations thereof, the second length of the restraint web greater than the first length of the energy absorption web such that the overall length of the restraint web increases as the energy absorption web elongates.

In another aspect, an energy-absorbing restraint web assembly may comprise a restraint web having a first end configured for attachment to at least one of a motor vehicle seat, a motor vehicle frame component, a motor vehicle floor and a web retractor secured within a motor vehicle, and a second end opposite the first end and configured for attachment to at least one of another restraint web and a releasable attachment device, an energy absorption web attached to the restraint web, the energy absorption web responsive to a transverse force applied to the restraint web between the first and second ends thereof that is greater than a threshold force to elongate, a sleeve extending at least partially about the restraint web, and a visual deployment indicator on the restraint web and covered by the sleeve as long as the energy absorption web is not elongated, the visual deployment indicator extending outwardly from the sleeve as the energy absorption elongates in response to the applied force.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWING

Figure 1A:
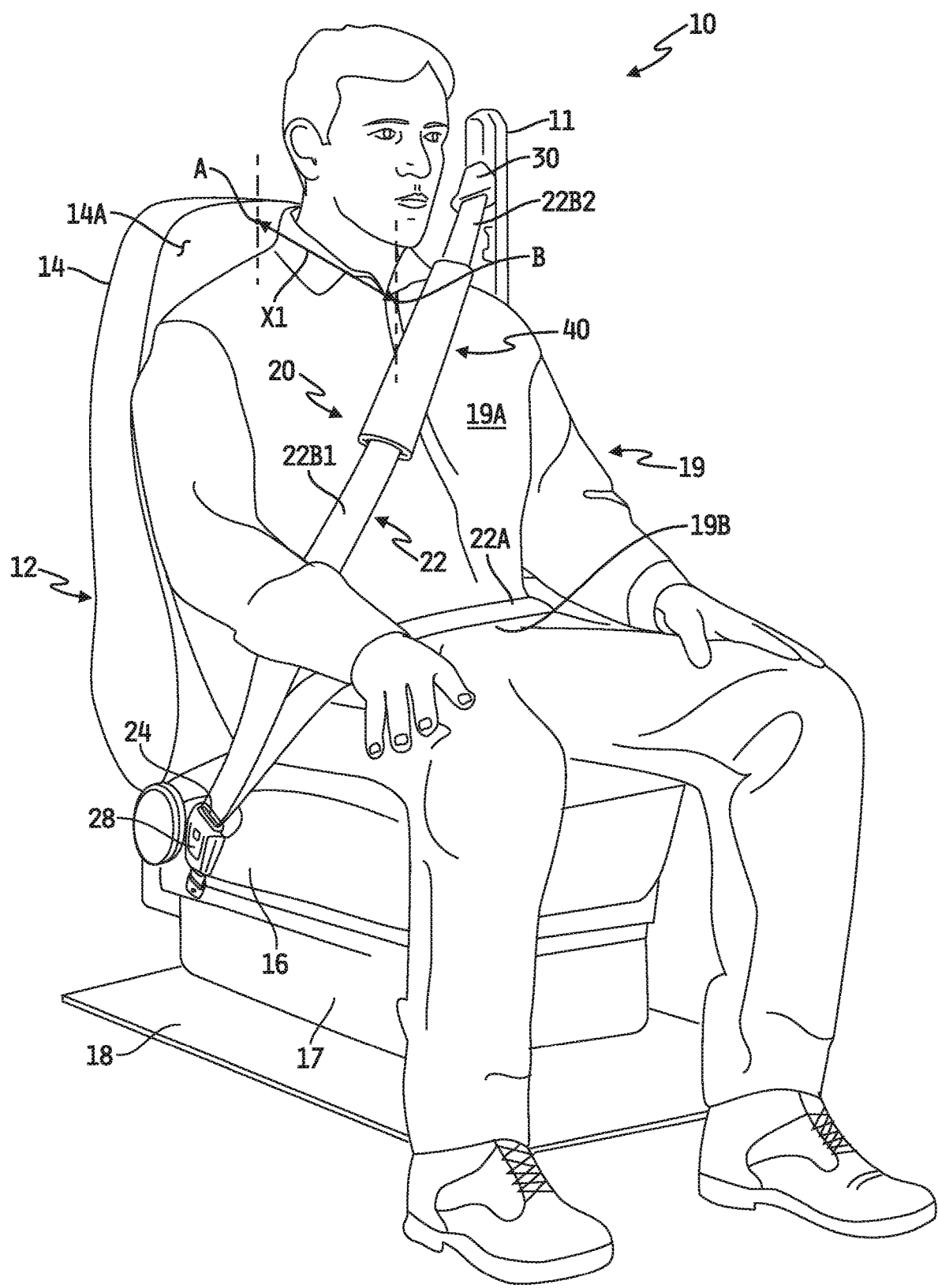
FIG. 1A is a front perspective view of an embodiment of a restraint system for a motor vehicle seat including a shoulder web-mounted energy-absorbing web assembly shown in a pre-deployed state thereof.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Figure 1B:
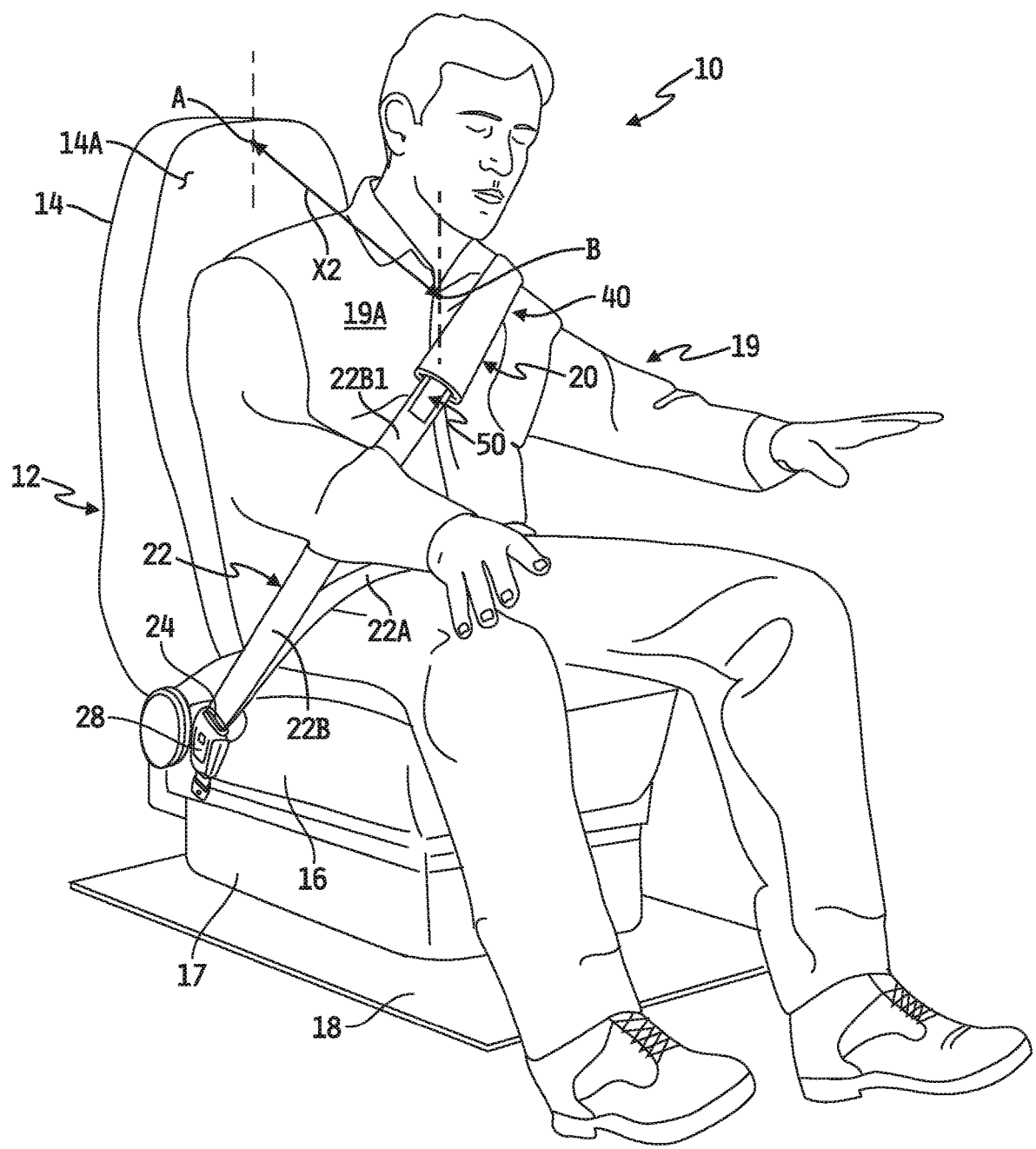
FIG. 1B is a front perspective view of the restraint system embodiment illustrated in FIG. 1A showing the shoulder web-mounted energy-absorbing web assembly in a deployed state.

Referring now to FIGS. 1A and 1B, an embodiment is shown of a motor vehicle 10 in which a restraint system 20 is mounted. In the illustrated embodiment, a motor vehicle seat 12 is mounted to and within the motor vehicle 10, e.g., to a floor 18 and/or one or more frame components and/or other support structure(s) of the vehicle 10. The restraint system 20 includes a web assembly 20 coupled to the motor vehicle seat 12 and configured to restrain an occupant 19 of and relative to the vehicle seat 12. In the embodiment illustrated in FIG. 1A, the web assembly 20 includes a single web 22 having a lap portion 22A configured to extend at least partially about and in contact with a lap 19B of the occupant 19, and a shoulder portion 22B configured to extend over a shoulder of the occupant 19, downwardly toward the lap portion 19B of the occupant 19, and at least partially about a torso 19A of the occupant 19. In the illustrated embodiment, an energy-absorbing web assembly 40 is mounted to the shoulder portion 22B of the web 22. The energy-absorbing web assembly 40 is shown in FIG. 1A in a pre-deployed state thereof and, as will be described in detail below, the energy-absorbing web assembly 40 is configured to be responsive to a force applied by the occupant 19 to the web assembly 20, and to the shoulder portion 22B of the web 22 in particular, that is greater than a threshold force to elongate to a deployed state, and thereby elongate the web 22, and to absorb energy while elongating as illustrated by example in FIG. 1B.

The motor vehicle seat 12 illustratively includes a seat back 14 coupled to a seat base 16, wherein the seat base 16 and seat back 14 are configured in a conventional manner to support the occupant 19 seated in the seat 12. The seat base 16 is illustratively mounted to a seat mounting base 17 which is affixed or slidably mounted to the floor 18 and/or other support structure of the motor vehicle 10. In some alternate embodiments, the seat mounting base 17 may be omitted and the seat base 16 may be mounted directly to the floor 18 or other support structure of the motor vehicle 10. In other alternate embodiments, one or more additional structural components may be mounted between the seat base 16 and the floor 18 or other support structure of the motor vehicle 10. The motor vehicle 10 in which the vehicle seat 12 is mounted may illustratively be any motor vehicle configured to accommodate and transport one or more occupants, and examples include, but are not limited to, a lift truck, a recreational vehicle such as an all-terrain vehicle (ATV), dune buggy or other off-road recreational or off-road vehicle generally, an automobile, a light, medium or heavy-duty truck, an electric vehicle, a utility vehicle, a commercial vehicle, an industrial vehicle, a bus, a racing vehicle, and the like.

In the embodiment illustrated in FIG. 1A, one end of the lap portion 22A of the web 22 is affixed to the seat base 16 and/or to seat mounting base 17 in a conventional manner (not shown) on or along one side of the seat 12 (e.g., on the left side of the occupant 19), and the lap portion 22A extends through a web slot formed in and through a conventional tongue member 24 from which the shoulder portion 22B of the web 22 emerges. A conventional buckle member 28 is affixed to the seat base 16 and/or to the seat mounting base 17 on or along the opposite side of the seat 12 (e.g., on the right side of the occupant 19). The tongue member 24 and the buckle member 28 are configured in a conventional manner for releasable engagement with each other. In alternate embodiments, the positions of the tongue 24 and the buckle member may be reversed such that the tongue member 24 is affixed to the seat base 16 and/or to the seat mounting base 17 and the buckle member 28 defines a slot through which the web 22 extends.

The shoulder portion 22B of the web 22 extends upwardly away from the tongue member 24 toward a restraint system post or other frame component 11 affixed to the floor 18 and/or other support structure(s) within the motor vehicle 10. The end of the web 22 defined at the shoulder portion 22B is affixed to the post 11, e.g. at or near a top thereof, via a conventional bracket 30. The web 22 thus extends between the seat base 16 and/or seat mount base 17 and the post 11, and extends through the slot in the tongue member 24 between its two ends. The position of the tongue member 24 along the web 22 is thus variable in a conventional manner and depends on the size and position of the occupant 19 relative to the vehicle seat 12. In some alternate embodiments, the shoulder web 22B may extend downwardly from the bracket 30 and operatively attach to a conventional web retractor mounted to the floor 18, seat mounting base 17 and/or seat base 16.

An energy-absorbing web assembly 40 is mounted to the shoulder portion 22B of the web 22 such that a lower portion 22B1 of the shoulder web 22B extends between the web assembly 40 and the tongue member 24, and an upper portion 22B2 of the shoulder web 22B extends between the web assembly 40 and the post 11. In some embodiments, the web assembly 40 is positioned partially about the shoulder and torso of the occupant 19 as illustrated by example in FIG. 1A, although in alternate embodiments the web assembly 40 may be positioned anywhere along the web 22. In any such embodiment(s), two or more energy-absorbing web assemblies 40 may be mounted to and along the web 22. Although only one such energy-absorbing web assembly 40 is illustrated in FIG. 1A, FIGS. 4A-6 illustrate alternate embodiments which may include two or more energy-absorbing web assemblies 40, and it will be understood that any such multiple energy-absorbing web assembly configurations are directly applicable and/or adaptable to the embodiment illustrated in FIG. 1A.

Referring now to FIGS. 2A-3B, perspective views are shown of an embodiment of the energy-absorbing web assembly 40 mounted to the shoulder web 22B. In the examples illustrated in FIGS. 2A and 2B, the energy-absorbing web assembly 40 is in a pre-deployment state; that is, before a force greater than a predetermined threshold force has been applied thereto by the occupant 19 of the vehicle seat 12, and in the examples illustrated in FIGS. 3A and 3B, the energy-absorbing web assembly 40 is in a deployed state; that is, after a force greater than the predetermined threshold force has been applied thereto by the occupant 19 of the vehicle seat 12 so as to elongate the web assembly 40.

In the embodiment illustrated in FIGS. 2A-3B, the energy-absorbing web assembly 40 includes a hollow sleeve 42 having opposite open ends 42A, 42B. The lower portion 22B1 of the shoulder web 22B extends below the open end 42A of the sleeve 42, and the upper portion 22B2 of the shoulder web 22B extends above the open end 42B. In the illustrated embodiment, the sleeve 42 circumscribes the shoulder web 22B, although in other embodiments the sleeve 42 may not extend fully about the shoulder web 22B. In the illustrated embodiment, the sleeve 42 is movable along the shoulder web 22B, e.g., toward and away from the bracket 30. In some alternate embodiments, such movement of the sleeve 42 may be restricted such as by elastically affixing the sleeve 42 to the web 22B at one or more locations along the web 22B.

Figure 2A:
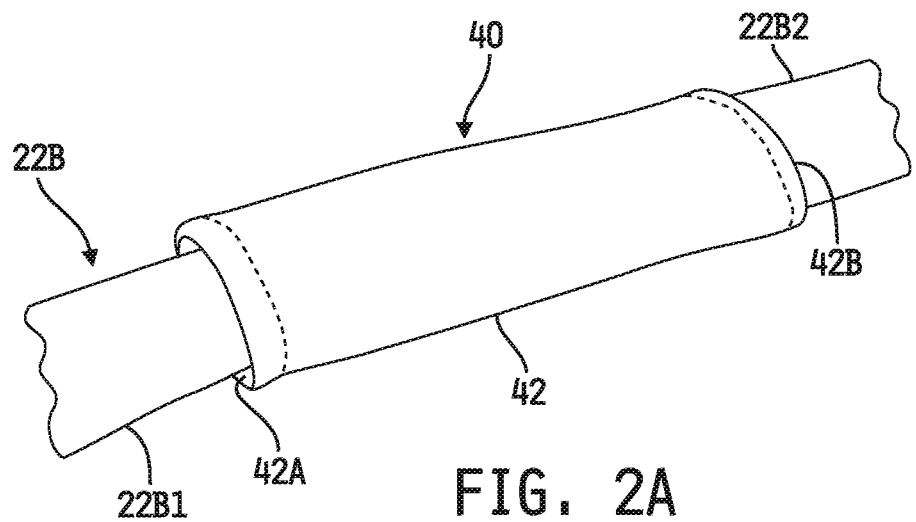
FIG. 2A is a perspective view of a portion of the shoulder web of the restraint system illustrated in FIGS. 1A and 1B showing the energy-absorbing web assembly in the pre-deployed state illustrated in FIG. 1A.
Figure 2B:
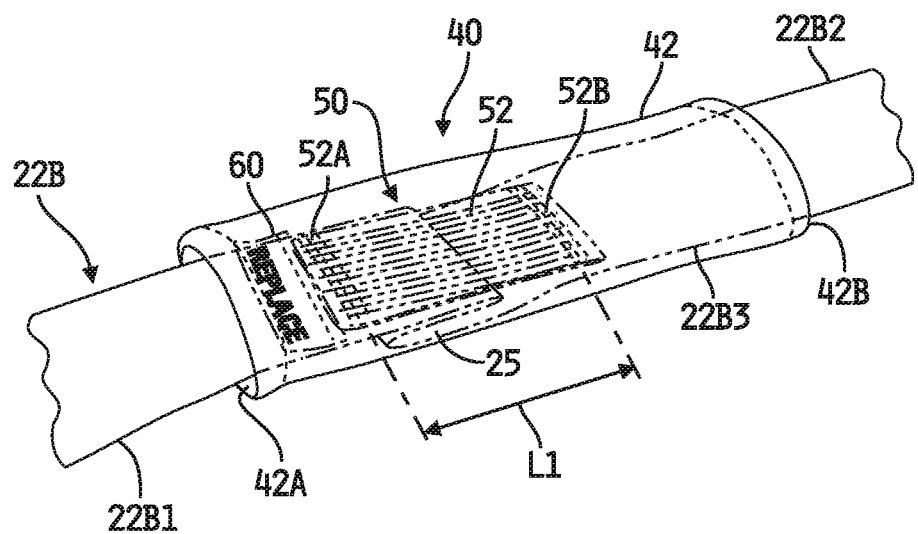
FIG. 2B is a perspective view similar to FIG. 2A showing some of the details of the pre-deployed energy-absorbing web assembly in dashed-line representation.

In the example illustrated in FIG. 2B, it can be seen that in the pre-deployment state of the energy-absorbing web assembly 40, the sleeve 42 generally hides an energy absorption device 50 attached or otherwise mounted to a portion 22B3 of the shoulder web 22B defined between the lower portion 22B1 of the shoulder web 22B and the upper portion 22B2 of the shoulder web 22B, and in some embodiments the sleeve 42 also hides a visual deployment indicator 60. In the illustrated embodiment, the energy absorption device 50 is provided in the form of an energy absorption web 52 affixed at opposite ends 52A, 52B thereof to the portion 22B3 of the shoulder web 22B so as to define a portion 25 of the shoulder web between the two ends 52A, 52B of the energy absorption web 52.

In its pre-deployed state, the energy absorption web 52 defines, as illustrated by example in FIG. 2B, a length L1 between the ends 52A, 52B thereof. In the embodiment illustrated in FIG. 2B, the length of the portion 25 of the shoulder web 22B defined between the two ends 52A, 52B of the energy absorption web 52 is longer than L1, but is limited to L1 in the pre-deployment state of the energy-absorbing web assembly 40 by the length, L1, of the energy absorption web 52. The excess length of the portion 25 of the shoulder web 22B defined between the two ends 52A, 52B of the energy absorption web 52 in the pre-deployment state of the energy absorbing web assembly 40 is illustratively looped or folded adjacent to the energy absorption web 52 so as to fit within the sleeve 42 as shown by example in FIG. 2B. In the illustrated embodiment, a visual deployment indicator 60 is integral with or attached to the energy absorption web 52 at or adjacent to the end 52A thereof. In some alternate embodiments the visual deployment indicator 60 may instead be attached to or integral with the portion 25 or portion 22B3 of the shoulder web 22B at or adjacent to the end 52A of the energy absorption web 52. In other alternate embodiments, the visual deployment indicator 60 may be attached to or integral with the energy absorption web 52 at or adjacent to the end 52B thereof, or attached to or integral with the portion 25 or portion 22B3 of the shoulder web 22B at or adjacent to the end 52B of the energy absorption web 52. In still other alternate embodiments, visual deployment indicators 60 may be attached to or integral with the energy absorption web 52 or the portion 25 or 22B3 of the shoulder web 22B at or adjacent to each end 52A, 52B of the energy absorption web 52. In any of the foregoing embodiments, the energy absorption web 52, the folded or looped portion 25 of the shoulder web 22B and the visual deployment indicator(s) 60 are, in the pre-deployment state of the energy-absorbing web assembly 40, all contained within, and thus hidden by, the sleeve 42 as illustrated in FIGS. 2A and 2B. In still further alternate embodiments, the visual deployment indicator(s) 60 may be omitted.

Figure 3A:
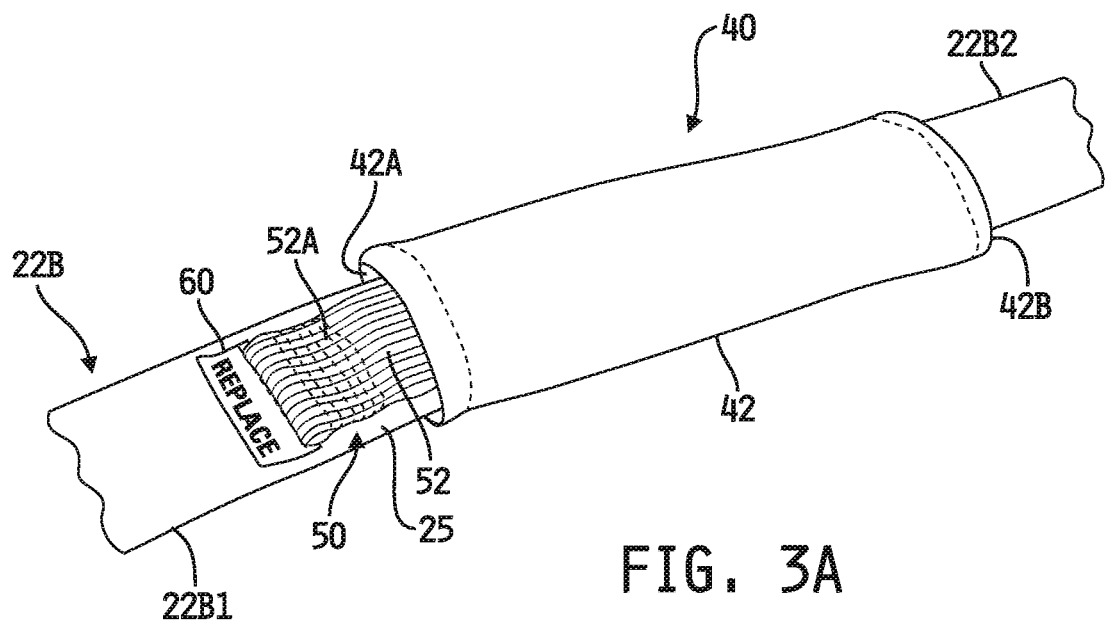
FIG. 3A is a perspective view a portion of the shoulder web of the restraint system illustrated in FIGS. 1A and 1B showing the energy-absorbing web assembly in the deployed state illustrated in FIG. 1B.
Figure 3B:
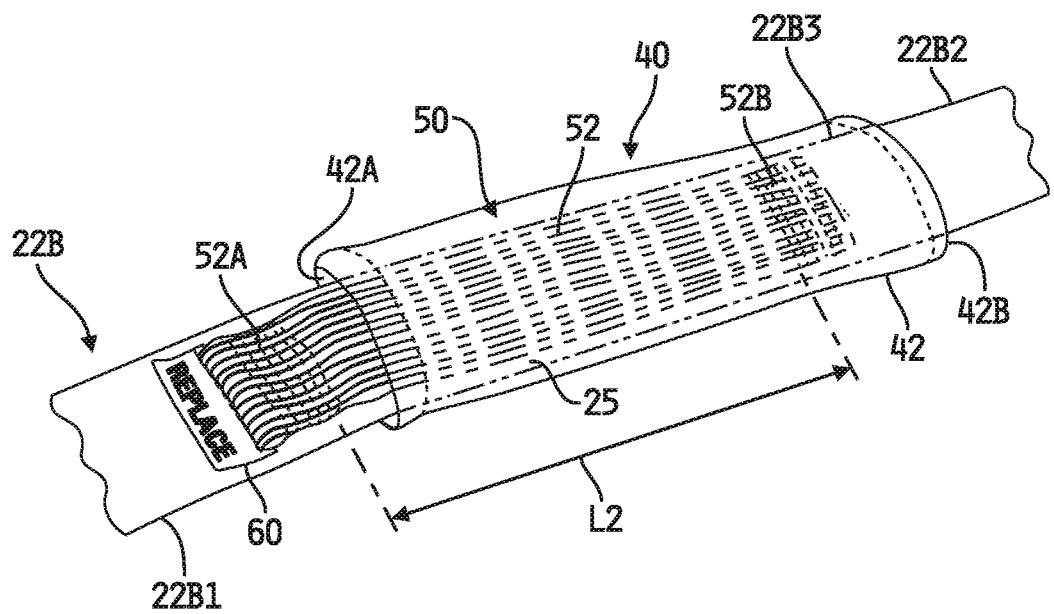
FIG. 3B is a perspective view similar to FIG. 3A showing some of the details of the deployed energy-absorbing web assembly in dashed-line representation.

The energy absorption web 52 is illustratively configured or selected so as to remain at the length L1, as is the portion 25 of the shoulder web 22B between the two ends of the energy absorption web 52, i.e., to remain in the pre-deployed state, so long as forward forces applied to the shoulder web 22B by the occupant 19 of the vehicle seat 12, i.e., in a direction generally forwardly away from a front surface 14A of the seat back 14, do not exceed a threshold force. When a forward force greater than the threshold force is applied by the occupant 19 to the shoulder web 22B, the energy absorption web 52 is configured to elongate, e.g., by one or a combination of stretching, deforming, unfolding, displacement of stitching or the like, and to absorb energy as the energy absorption web 52 elongates under such force. In the example illustrated in FIGS. 3A and 3B, the energy absorption web 52 is fully elongated such that the visual deployment indicator 60, in embodiments which include a visual deployment indicator 60, extends outside of, e.g., below, the end 42A of the sleeve 42 and thus becomes visible to an observer. As also illustrated in FIG. 3B, the total length of the now fully extended portion 25 of the shoulder web 22B extending between the two ends 52A, 52B of the energy absorption web 52 is L2 (>L1). In some embodiments, as illustrated in FIG. 3B, a portion of the energy absorption web 52 also extends below the end 42A of the sleeve 42 when the energy absorption web 52 is fully elongated, although in other embodiments the position of the visual deployment indicator 60 and/or of the energy absorption web 52 relative to the shoulder web 32 may be selected such that only the visual deployment indicator 60 (and little or none of the energy absorption web 52) extends outwardly of, e.g., below, the sleeve 40.

In one embodiment, the energy absorption web 52 is selected or configured such that the total displacement amount of the web 52 when fully elongated is approximately equal to L2-L1 such that the energy absorption web 52 is fully elongated when the distance between the two ends 52A, 52B thereof reaches L2. In other embodiments, the energy absorption web 52 may be selected or configured such that the total displacement amount of the web 52 when fully elongated is greater than L2-L1 such that the energy absorption web 52 is not fully elongated, but is stopped from becoming so by the portion 25 of the shoulder web 22B, when the distance between the two ends 52A, 52B of the energy absorption web 52 reaches L2. In still other embodiments, the energy absorption web 52 may be selected or configured such that the total displacement amount of the web 52 when fully elongated is less than L2-L1 such that the energy absorption web 52 is fully elongated before the distance between the two ends 52A, 52B thereof reaches L2. In some such embodiments, the energy absorption web 52 may illustratively be configured to fail, or begin to fail, as it further elongates to L2. In other embodiments in which the total elongated length of the energy absorption web 52 is L2 and the total length of the portion 25 of the shoulder web 22B extending between the two ends 52A, 52B of the energy absorption web 52 is greater than L2, the energy absorption web 52 may be configured to hold at its maximum elongation length L2 and thereby inhibit the portion 25 of the shoulder web 22B from reaching its full length that is greater than L2.

In one embodiment, which is not to be considered limiting in any way, the energy absorption web 52 is a woven material, e.g. a polyester, partially-oriented yarn (POY) or other woven material, that is selectively woven such that is plastically deforms in the longitudinal direction of the web 52 (and absorbs energy in the process) as load, i.e., force, is applied to the web 52 having a force (or load) component between its two ends 52A, 52B that is greater than the threshold force (or load) value. In other embodiments, the energy absorption web 52 may be or include one or more other materials that elongate under load plastically or elastically. In still other embodiments, the energy absorption web 52 may be or include one or more material structures and/or techniques which allow or facilitate elongation of the web 52 under load, e.g., by unfolding, by displacement of stitching and/or other medium that joins two or more sections of the web 52 so as to unjoin two or more such sections of the web 52, etc. The shoulder web 22B is illustratively a conventional woven fabric web material, although in alternate embodiments the shoulder web 22B may be or include any suitable material from which a conventional motor vehicle occupant restraint web, strap or belt may be formed.

In the illustrated embodiment, the visual deployment indicator 60 is provided in the form of a patch or tag upon which, when the energy absorption web 52 has been at least partially deployed, appears a textual message "REPLACE" extending from and below the end 42A of the sleeve 42 to notify an observer that the energy-absorbing web assembly 40 has been deployed and requires replacement. In other embodiments, the visual deployment indicator 60 may alternatively or additionally be provided in the form of a patch, tag, emblem or portion of the shoulder web 22B that is color coded, that contains or includes one or more graphic images or elements, and/or that contains or includes a textual message like, or different from, that illustrated by example in FIGS. 2B and 3B, and which extends from and below the end 42A of the sleeve 42, extends from and above the end 42B of the sleeve 42, becomes visible through a window or portal formed in and/or through one or more portions of the sleeve 42 or otherwise becomes visible to an observer, to provide notification that the energy-absorbing web assembly 40 has been deployed and requires replacement.

Referring again to FIGS. 1A and 1B, an embodiment of a process by which desired elongation characteristics of the energy absorption web 52 may be determined will now be described. Based on such desired elongation characteristics, the energy absorption web 52 can then be designed and/or selected to achieve such desired elongation characteristics when the shoulder web 22B is subjected to forward forces applied thereto by the occupant 19 of the vehicle seat 12, i.e., in a direction generally forwardly away from a front surface 14A of the seat back 14, that exceed the threshold force as described above.

Referring specifically to FIG. 1A, the motor vehicle 10, the vehicle seat 12 and the occupant 19 seated in the vehicle seat 12 are all in an "at rest" state in which the lap and shoulder webs 22A, 22B extend about the occupant 19 as described above and with the tongue member 24 engaged with the buckle member 28 such that the restraint system 20 engages the occupant 19 to restrain the occupant 19 in and relative to the vehicle seat 12, and in which the occupant 19 is not subjecting the restraint system 20, and in particular the shoulder web 22B, to any forward forces, i.e., in a direction generally forwardly away from a front surface 14A of the seat back 14 or, said differently, in a transverse direction relative to the shoulder web portions 22B1 and 22B2, resulting from motion and/or impact of the motor vehicle 10 in which the vehicle seat 12 is mounted. In this "at rest" state, the distance between an arbitrary point "A" on the seat back 14, e.g., on the front surface 14A of the seat back 14 near the top thereof, and an arbitrary point "B" on the occupant 19, e.g., at the front of the torso 19A or chest area just under the occupant's throat, is X1 as shown. Now referring specifically to FIG. 1B, the energy absorption web 52, and thus the shoulder web 22B, is in a fully deployed state in which the occupant 19 has subjected the restraint system 20, and in particular the shoulder web 22B, to a forward force, i.e., in a direction generally forwardly away from a front surface 14A of the seat back 14 or, said differently, in a transverse direction relative to the shoulder web portions 22B1 and 22B2, resulting from motion and/or impact of the motor vehicle 10, that is greater than a threshold elongation force of the energy absorption web 52 and to which the energy absorption web 52, and thus the shoulder web 22B, is responsive to fully elongate, e.g., from L1 to L2, as described above, thereby increasing the distance between the points "A" and "B" to X2 as shown.

In the example illustrated in FIGS. 1A and 1B, the difference, $\Delta X$, between X2 and X1 illustratively represents the amount or distance of forward travel of the occupant 19 relative to the seat back 14 when subjecting the restraint system 20, and in particular the shoulder web 22B, in its "at rest" state illustrated in FIG. 1A to the forward force greater than the threshold force such that the shoulder web 22B, transitions, e.g., via elongation of the energy absorption web 52, to its fully deployed state illustrated in FIG. 1B. As the occupant 19 moves the distance $\Delta X$ relative to the seat back 14, the torso 19A of the occupant performs work on the shoulder web 22B causing it to elongate as described above, i.e., causing the energy absorption web 52 to elongate, thus increasing the length of the shoulder web 22B as described above. It is desirable for $\Delta X$ to be a relatively small value in order to allow the occupant 19 to reach dynamic equilibrium without submarining, i.e. without being forced forwardly and downwardly under the lap web 22A of the restraint system 20. To achieve this goal with respect to the embodiment illustrated in FIGS. 1A and 1B, it has been empirically determined that $\Delta X$ should be between about 2.5 centimeters and 10 centimeters.

The work performed by the energy absorption web 52 may illustratively be expressed as work performed by a variable force according to the relationship $W=\int_a^b kx\, dx$, where W is the work performed by the energy absorption web 52 as it elongates as described above, k is an expansion rate of the energy absorption web 52, "a" is the elongation amount of the web 52 for a small occupant 19, e.g., $5^{th}$ percentile adult and "b" is the elongation amount of the web 52 for a large occupant 19, e.g., $95^{th}$ percentile adult, which will result in movement of forward movement or excursion of the occupant 19 relative to the vehicle seat back 14 by the amount $\Delta X$. One example energy absorption web 52, e.g., in the form of a POY web, behaves linearly and k illustratively has a rate, e.g., like a spring, after its activation force threshold is reached. Resulting from force/deflection testing, an appropriate k rate for this example type of energy absorption web 52 was determined to be approximately 7.6 centimeters/second. The elongation amounts "a" and "b" are those, illustratively determined via testing, that allow torso rotation of the occupant 19 to reach dynamic equilibrium without submarining, i.e., which results in forward movement or excursion of the occupant 19 relative to the vehicle seat back 14 by the amount $\Delta X$. By integration and substitution using the above work relationship and developed parameter values, the range of work required to be performed by the example type of energy absorption web 52 described above which satisfies the elongation amounts for both small and large occupants 19, is determined to be about 2.3-39.5 Joules or 20-350 inch-lbs. The particular energy absorption web 52 to be implemented may thus be designed or selected as that which performs the example range of work while satisfying the applicable elongation amounts. Performance of work by the energy absorption web 52 in excess of the above-determined work range has been found to allow excessive torso excursion, and performance of work by the energy absorption web 52 less than the above-determined work range has been found to result in insufficient torso excursion and submarining. By limiting the work performed by the energy absorption web 52 to the range just described, the amount or length ΔX of forward excursion of the occupant 19 can be advantageously controlled or limited to an acceptable or desired range, e.g., 2.5 cm-10 cm as described in the above example. As the amount of work performed by the energy absorption web 52 during such elongation is related to the force required to cause such elongation according to the relationship W=F×D, where W is the work performed, F is the applied force and D is the elongation amount, length or distance, testing and/or selection of an energy absorption web 52 candidate for compliance with the example work range over the applicable elongation amounts can be carried out via conventional force testing and measurement techniques.

Figure 4A:
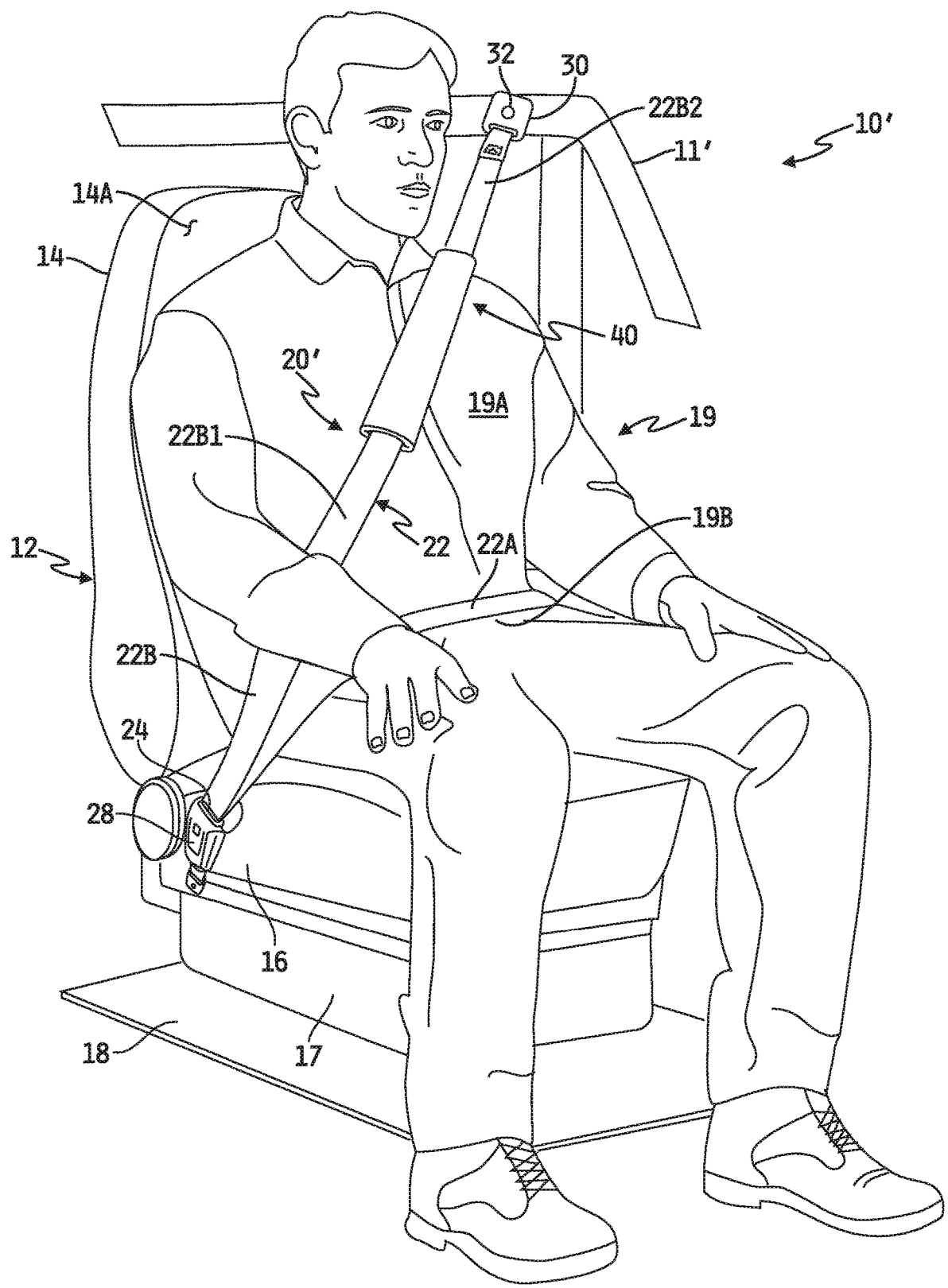
FIG. 4A is a front perspective view of another embodiment of a restraint system for a motor vehicle seat including a shoulder web-mounted energy-absorbing web assembly shown in a pre-deployed state thereof.

It will be appreciated that the one or more energy absorbing web assemblies 40 illustrated and described herein may be mounted to or made integral with restraint systems of any desired configuration with the same, fewer or greater number of points of restraint as that illustrated in FIGS. 1A and 1B. Referring now to FIG. 4A, for example, another embodiment is shown of a motor vehicle 10' in which an alternate restraint system 20' is mounted. In the illustrated embodiment, the motor vehicle 10', vehicle seat 12 and occupant 19 are all as described with respect to FIGS. 1A and 1B. The restraint system 20' is similar in many respects to the restraint system 20 illustrated in FIGS. 1A and 1B, and like numbers are therefore used to identify like components. The restraint system 20' illustrated in FIG. 4A differs from that illustrated in FIGS. 1A and 1B in that the free end of the shoulder web 22B is affixed, e.g., via a bracket 30 and conventional fixation member 32, e.g., bolt, screw or the like, to a frame component 11' of the vehicle 10'. The restraint system 20' is otherwise identical in structure and operation to the restraint system 20 illustrated in FIGS. 1A and 1B, and the energy absorbing web assembly 40 included in the restraint system 20' is illustratively positioned to engage the front portion of the shoulder and upper torso of the occupant. The energy absorbing web assembly 40 illustrated in FIG. 4A is illustratively identical in structure and operation as described with respect to the embodiment illustrated in FIGS. 1A and 1B. As with the embodiment illustrated in FIGS. 1A and 1B, the energy absorbing web assembly 40 may alternatively be positioned at other locations along the shoulder web 22B or lap web 22A. Alternatively or additionally, the restraint system 20' may, as with the embodiment illustrated in FIGS. 1A and 1B, include two or more energy absorbing web assemblies 40 variously positioned along the shoulder web 22B and/or the lap web 22A.

The work range requirements of the energy absorption web 52 or other such energy absorbing structure housed within the energy absorbing web assembly 40 may illustratively be determined consistently with the example described with respect to FIGS. 1A and 1B. It will be understood, however, that in embodiments which include multiple energy absorbing web assemblies 40, the total work range requirements of all energy absorbing web assemblies 40, i.e., for the web restraint system 20', will be distributed among each individual energy absorbing web assembly 40, and the design and/or selection of the various energy absorption webs 52 or other such energy absorbing structures will take such distributed work range requirements into consideration.

Figure 4B:
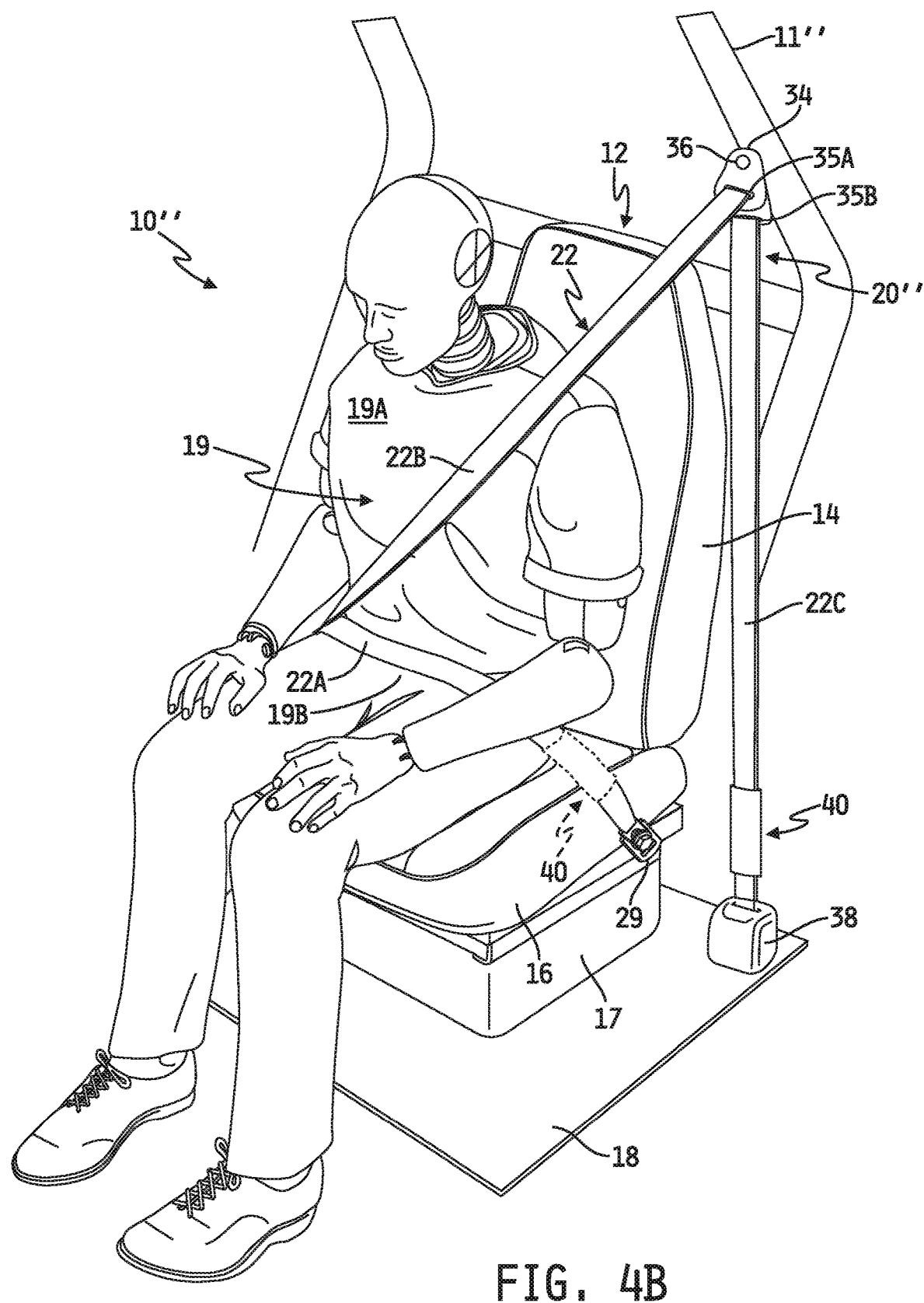
FIG. 4B is a front perspective view of yet another embodiment of a restraint system for a motor vehicle seat including a shoulder web-mounted energy-absorbing web assembly shown in a pre-deployed state thereof.

Referring now to FIG. 4B, another example embodiment is shown of a motor vehicle 10" in which another alternate restraint system 20" is mounted. In the illustrated embodiment, the motor vehicle 10", vehicle seat 12 and occupant 19 are all as described with respect to FIGS. 1A and 1B. The restraint system 20" is similar in some respects to the restraint system 20 illustrated in FIGS. 1A and 1B, and like numbers are therefore used to identify like components. The restraint system 20" illustrated in FIG. 4B differs from that illustrated in FIGS. 1A and 1B in that the free end of the shoulder web 22B is passed through slots 35A, 35B formed in and through a bracket 34 affixed via a conventional fixation member 36, e.g., bolt, screw or the like, to a frame component 11" of the vehicle 10". A retracting portion 22C of the web 22 extends between the bracket 34 and a free end thereof is attached to a spool of a conventional web retractor 38 that is mounted, e.g., affixed, to the floor 18 and/or other support structure(s) of the motor vehicle 10". In some embodiments, the retractor 38 may be a locking retractor, and in other embodiments the retractor 38 may be a non-locking retractor. In still other alternate embodiments, the retractor 38 may be omitted and the free end of the web portion 22C may be mounted, e.g., via a suitable bracket, to the floor 18 and/or other support structure(s) of the motor vehicle 10". As shown in FIG. 4B, the free end of the lap web 22A is illustratively affixed to the seat base 16 (and/or seat mounting base 17 and/or floor 18), and it will be understood that such fixation of the free end of the lap web 22A may likewise be representative of embodiments illustrated in FIGS. 1A and 1B in which the free end of the lap web 22A is likewise affixed to the seat base 16 and/or seat mounting base 17 and/or floor 18.

In the embodiment illustrated in FIG. 4B, the restraint system 20" includes an energy absorbing web assembly 40 illustratively mounted to or integral with the web portion 22C as shown. In the illustrated embodiment, the energy absorbing web assembly 40 is identical in structure and operation to the restraint system 20 illustrated in FIGS. 1A and 1B so as to provide for movement of the occupant torso 19A by the amount ΔX relative to the vehicle seat back 14 in response to a forward force applied by the occupant to the shoulder web 22B, e.g., in the direction forwardly away from the seat back 14, that exceeds the threshold force. As with the embodiments illustrated in FIGS. 1A, 1B and 4A, the energy absorbing web assembly 40 may alternatively be positioned at other locations along the shoulder web 22B, lap web 22A and/or web portion 22C. Alternatively or additionally, the restraint system 20" may, as with the embodiments illustrated in FIGS. 1A, 1B and 4A, include two or more energy absorbing web assemblies 40 variously positioned along the shoulder web 22B and/or the lap web 22A and/or the web portion 22C. In the embodiment illustrated in FIG. 4B, for example, an alternate or additional energy absorbing web assembly 40 is shown in dashed-line representation as being mounted to or integral with the lap portion 22A of the web 22.

The work range requirements of the energy absorption web 52 or other such energy absorbing structure housed within the energy absorbing web assembly 40 may illustratively be determined consistently with the example described with respect to FIGS. 1A and 1B. It will be understood, however, that in embodiments which include multiple energy absorbing web assemblies 40, the total work range requirements of all energy absorbing web assemblies 40, i.e., for the web restraint system 20″, will be distributed among each individual energy absorbing web assembly 40, and the design and/or selection of the various energy absorption webs 52 or other such energy absorbing structures will take such distributed work range requirements into consideration.

Figure 5A:
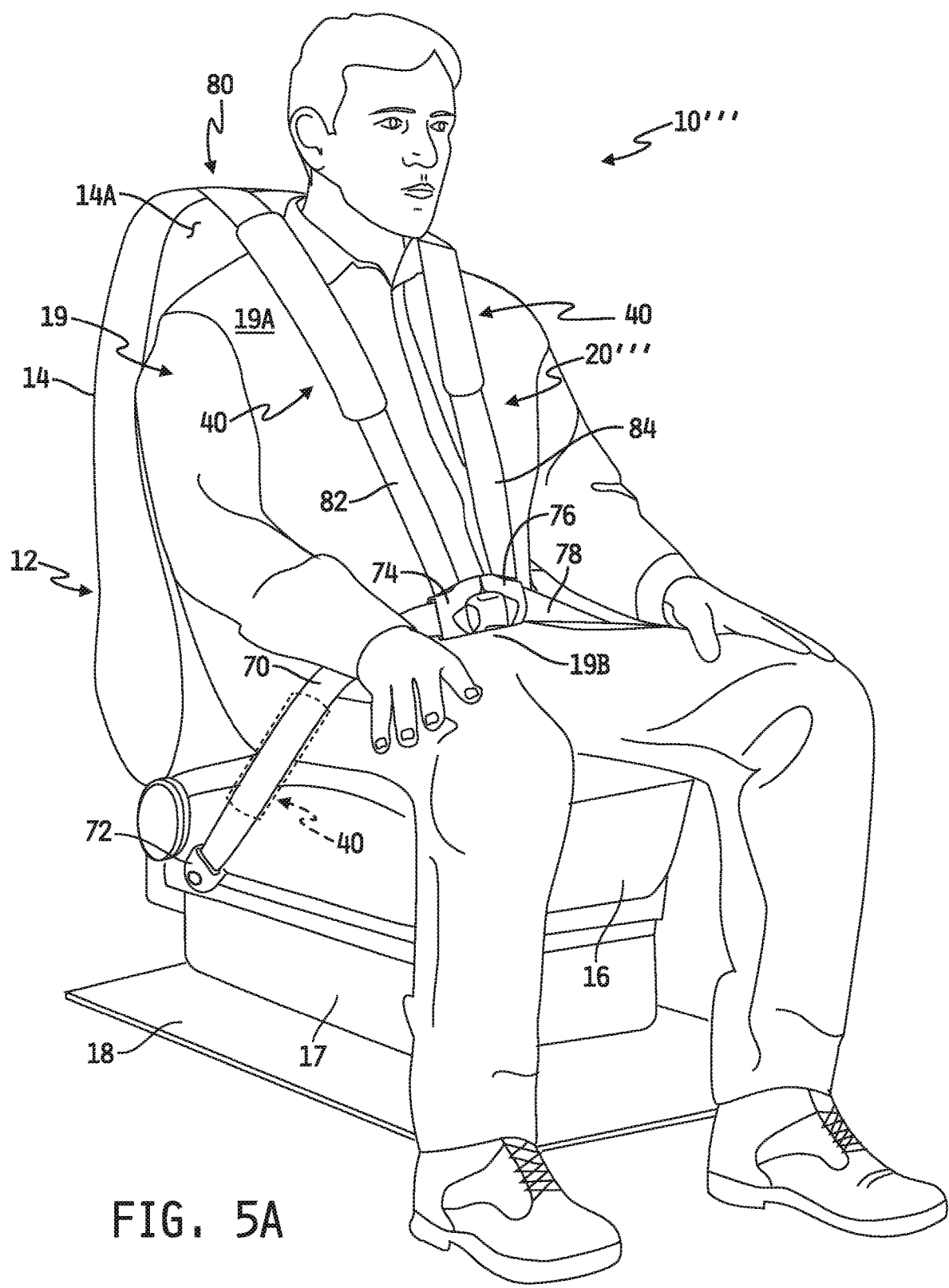
FIG. 5A is a front perspective view of still another embodiment of a restraint system for a motor vehicle seat including a pair of shoulder web-mounted energy-absorbing web assemblies shown in pre-deployed states thereof.
Figure 5B:
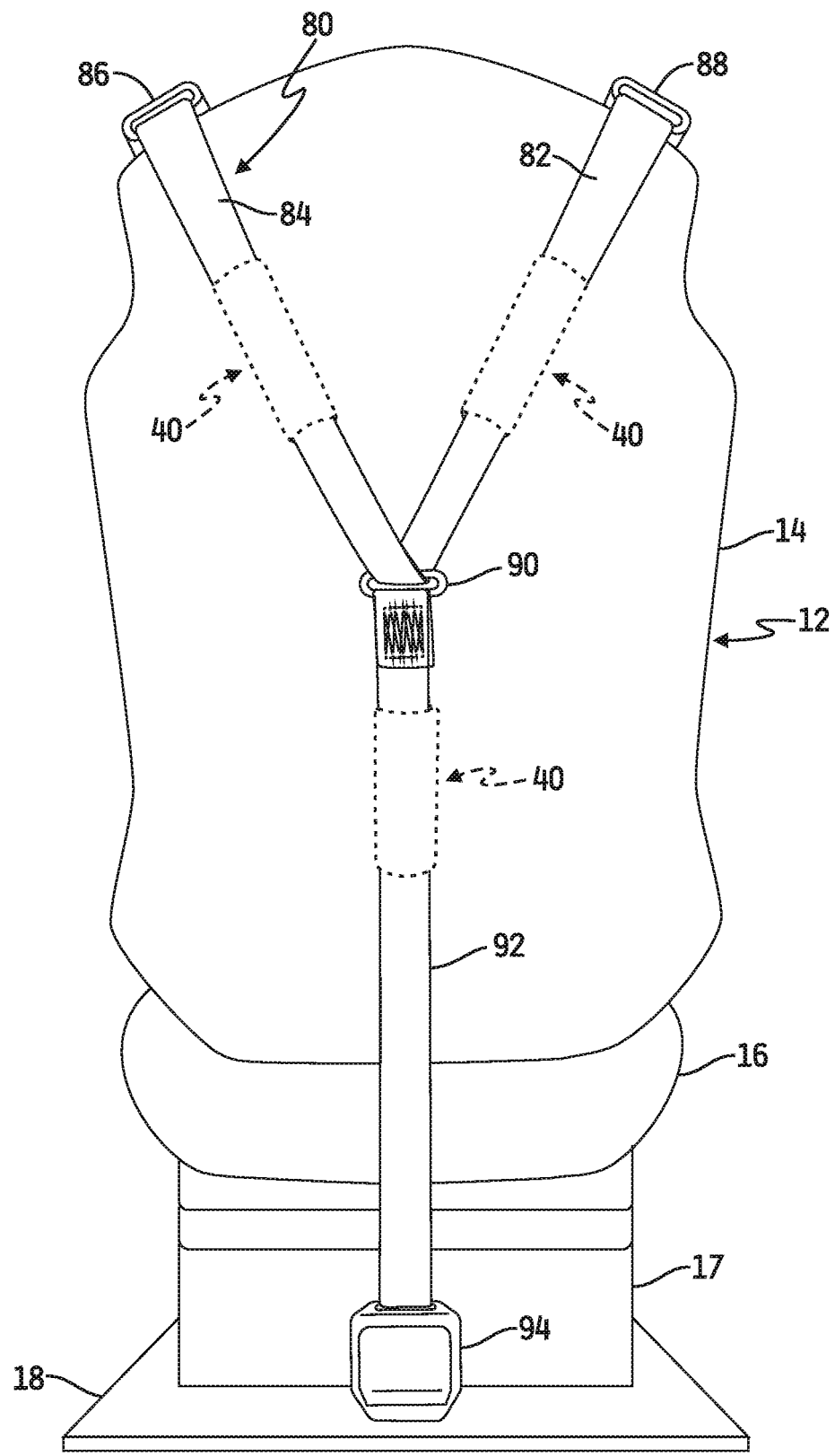
FIG. 5B is a rear elevational view of the restraint system illustrated in FIG. 5A.

Referring now to FIGS. 5A and 5B, yet another example embodiment is shown of a motor vehicle 10‴ in which yet another alternate restraint system 20‴ is mounted. In the illustrated embodiment, the motor vehicle 10‴, vehicle seat 12 and occupant 19 are all as described with respect to FIGS. 1A and 1B. The restraint system 20‴ illustrated in FIGS. 5A and 5B is a four-point restraint system having a single shoulder web 80 which includes two shoulder or torso web portions 82, 84 each configured to extend through a corresponding web guide 88, 86 respectively mounted to or near a top end of the seat back 14, and the over a different shoulder of the occupant 19 of the vehicle seat 12, and to then extend downwardly along either side of the torso 19A of the occupant 19 and coupled to a conventional tongue member 74, in the case of the shoulder web portion 82, and to a conventional buckle member 76, in the case of the shoulder web portion 84. In alternate embodiments, the positions of the tongue and buckle members 74, 76 may be reversed, i.e., the shoulder web portion 82 may be coupled to a buckle member and the shoulder web portion 84 may be coupled to a tongue member. In any case, the shoulder web portions 82, 84 in the illustrated embodiment are provided in the form of a single web 80 coupled at the rear of the seat back 14 to one end of a connecting web 92, e.g., via a conventional web guide loop 90, and an opposite end of the connecting web 92 is operatively coupled to a conventional web retractor 94 illustratively mounted to the seat mounting base 17 such that the connecting web 92 can be retracted within and paid out of the retractor 94 in a conventional manner. In some alternate embodiments, the retractor 94 may be coupled to the seat base 16, to the seat back 14 and/or to the floor 18 or other support structure or surface within the motor vehicle 10‴. The web retractor 94 may illustratively be locking or non-locking. In other alternate embodiments, the shoulder web portions 82, 84 may be separate webs, i.e., separate from each other, with each coupled to a different web retractor attached to the seat mounting base 17, to the seat base 16, to the seat back 14 and/or to the floor 18 or other support structure or surface within the motor vehicle 10‴. In still other alternative embodiments, the shoulder webs 82, 84, whether implemented as a single web or separate webs, may be attached directly to the seat mounting base 17, to the seat base 16, to the seat back 14 and/or to the floor 18 or other support structure or surface within the motor vehicle 10‴, i.e., the retractor 94 may be omitted.

Also coupled to the tongue and buckle members 74, 76 are lap webs 70 and 78 respectively. One end of the lap web 70 is illustratively coupled to the tongue member 74, and the opposite end of the lap web 70 is illustratively affixed, e.g., via a conventional mounting bracket 72, to the seat base 16 and/or to the seat mounting base 17. One end of the other lap web 78 is illustratively coupled to the buckle member 74, and the opposite end of the lap web 74 is illustratively affixed, e.g., via a conventional mounting bracket (not shown but similar or identical to the mounting bracket 72), to the seat base 16 and/or to the seat mounting base 17. When the tongue and buckle members 74, 76 are engaged, the lap webs 70, 78 illustratively engage the occupant 19 about the occupant's lap area 19B, and the shoulder web portions 82, 84 illustratively engage the occupants torso 19A on either side of the occupant's head. When the tongue and buckle members 74, 76 are disengaged, the webs 74, 78, and 82, 84 may be manually separated from the occupant 19 to provide for ingress/egress of the occupant 19 to/from the vehicle seat 12.

In the embodiment illustrated in FIGS. 5A and 5B, the restraint system 20‴ includes two energy absorbing web assemblies 40 illustratively mounted to or integral with each of the shoulder web portions 82, 84 as shown. In the illustrated embodiment, the energy absorbing web assemblies 40 are identical in structure and operation to the restraint system 20 illustrated in FIGS. 1A and 1B so as to provide for movement of the occupant torso 19A by the amount $\Delta X$ relative to the vehicle seat back 14 in response to a forward force applied by the occupant to the shoulder webs 82, 84, e.g., in the direction forwardly away from the seat back 14, that exceeds the threshold force.

As with the embodiments illustrated in FIGS. 1A, 1B, 4A and 4B the energy absorbing web assemblies 40 illustrated in FIG. 5A may alternatively be positioned at other locations along the shoulder web portions 82, 84, lap web(s) 70 and/or 78. Alternatively or additionally, the restraint system 20‴ may, as with the embodiments illustrated in FIGS. 1A, 1B, 4A and 4B include one or more additional energy absorbing web assemblies 40 variously positioned along either shoulder web 82, 84, either lap web 70, 78, and/or the connecting web 92. In the embodiment illustrated in FIG. 5A, for example, an alternate or additional energy absorbing web assembly 40 is shown in dashed-line representation as being mounted to or integral with the lap web 70. Alternatively or additionally, as illustrated in FIG. 5B, energy absorbing web assemblies 40 are shown in dashed-line representation as being mounted to or integral with the shoulder web portions 82, 84 along the rear of the seat back 14. Alternatively or additionally still, and as also illustrated in FIG. 5B, an energy absorbing web assembly 40 is shown in dashed-line representation as being mounted to or integral with the connecting web 92.

As described above, the total work range requirements of the two energy absorbing web assemblies 40 illustrated in FIG. 5A is distributed among each individual energy absorbing web assembly 40, and the design and/or selection of the corresponding energy absorption webs 52 or other such energy absorbing structures will take such distributed work range requirements into consideration. It will be understood, however, that in embodiments which include more or fewer energy absorbing web assemblies 40, the total work range requirements of all energy absorbing web assemblies 40, i.e., for the web restraint system 20″, will be distributed among each individual energy absorbing web assembly 40, and the design and/or selection of the various energy absorption webs 52 or other such energy absorbing structures will take such distributed work range requirements into consideration.

Figure 6:
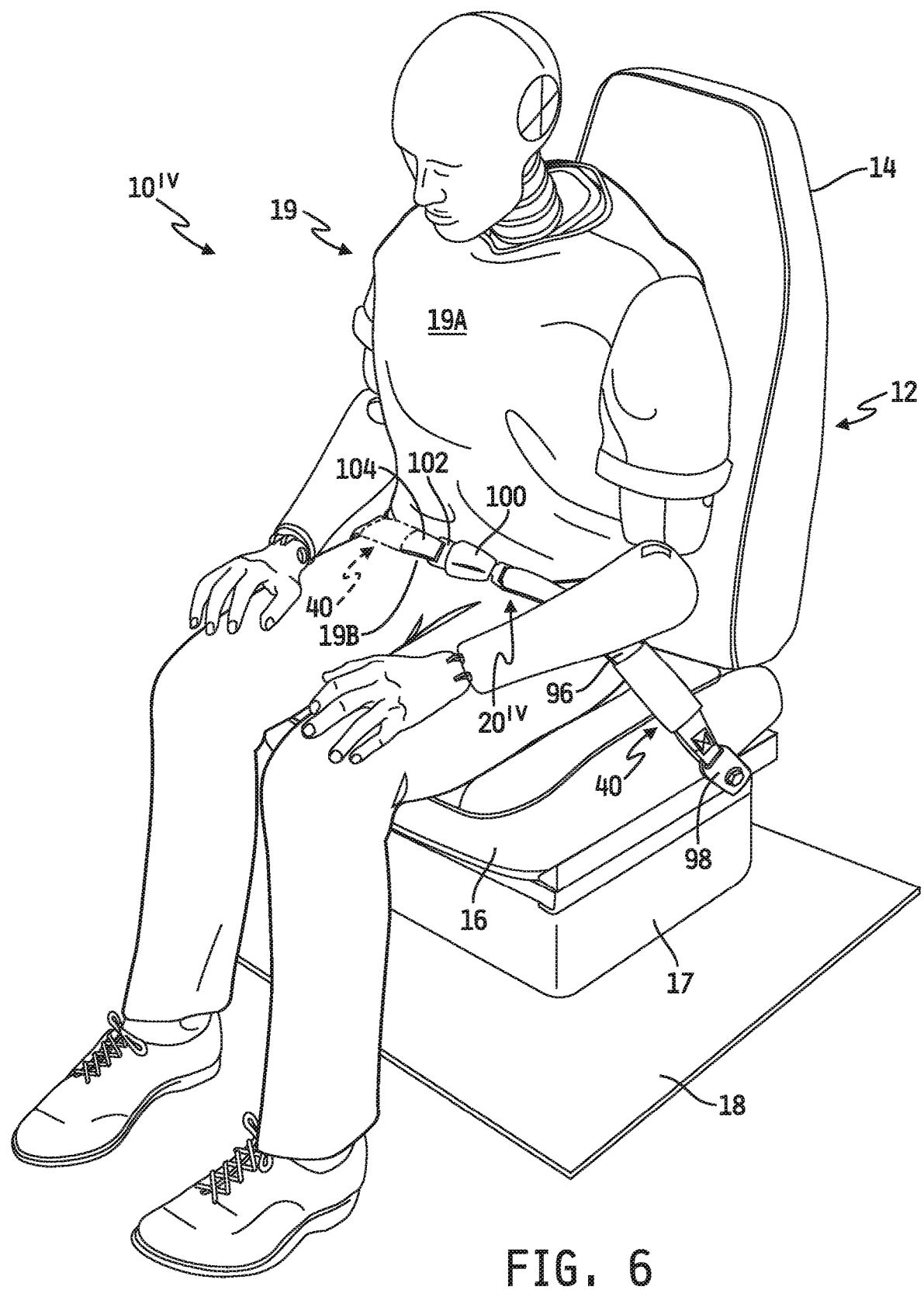
FIG. 6 is a front perspective view of a further embodiment of a restraint system for a motor vehicle seat including a lap web-mounted energy-absorbing web assembly shown in a pre-deployed state thereof.

Referring now to FIG. 6, still another example embodiment is shown of a motor vehicle $10^{IV}$ in which yet another alternate restraint system $20^{IV}$ is mounted. In the illustrated embodiment, the motor vehicle $10^{IV}$, vehicle seat 12 and occupant 19 are all as described with respect to FIGS. 1A and 1B. The restraint system $20^{IV}$ illustrated in FIG. 6 is a two-point restraint system including a lap web 96 having one end affixed or attached to the seat base 16 and/or the seat mounting base 17 via conventional mounting bracket 98 and an opposite end coupled to a conventional buckle member 100, and another lap web 104 having one end affixed or attached to the seat base 16 and/or the seat mounting base 17 via a conventional (not shown but similar or identical to the mounting bracket 98) and an opposite end coupled to a conventional tongue member 102. In alternate embodiments, the positions of the buckle and tongue members 100, 102 may be reversed, i.e., the lap web 96 may be coupled to a tongue member and the lap web 104 may be coupled to a buckle member. In any case, when the tongue and buckle members 100, 102 are engaged, the lap webs 96, 104 illustratively engage the occupant 19 about the occupant's lap area 19B, and when the tongue and buckle members 100, 102 are disengaged, the lap webs 96, 104 may be manually separated from the occupant 19 to provide for ingress/egress of the occupant 19 to/from the vehicle seat 12.

In some alternate embodiments, a conventional locking or non-locking web retractor may be coupled to the seat base 16, to the seat back 14 and/or to the floor 18 or other support structure or surface within the motor vehicle $10^{IV}$ on either or both sides of the vehicle seat 12, and the mounted end(s) of the lap web(s) 96 and/or 104 may be attached to a spool of such a retractor(s).

In the embodiment illustrated in FIG. 6, the restraint system $20^{IV}$ includes an energy absorbing web assembly 40 illustratively mounted to or integral with the lap web 96 as shown. In the illustrated embodiment, the energy absorbing web assembly 40 is identical in structure and similar in operation to the energy absorbing web assembly 40 of the restraint system 20 illustrated in FIGS. 1A and 1B so as to provide for movement of the occupant lap area 19B by the amount $\Delta X$ relative to the vehicle seat back 14 in response to a forward force applied by the occupant to the tongue/buckle engaged lap webs 96, 104, e.g., in the direction forwardly away from the seat back 14, that exceeds the threshold force.

As with the embodiments illustrated in FIGS. 1A, 1B, 4A, 4B and 5A-5B, the energy absorbing web assembly 40 illustrated in FIG. 6 may alternatively be positioned at other locations along the lap web 96 and/or 104. Alternatively or additionally, the restraint system $20^{IV}$ may, as with the embodiments illustrated in FIGS. 1A, 1B, 4A, 4B and 5A-5B, include one or more additional energy absorbing web assemblies 40 variously positioned along either or both of the lap webs 96, 104. In the embodiment illustrated in FIG. 6, for example, an alternate or additional energy absorbing web assembly 40 is shown in dashed-line representation as being mounted to or integral with the lap web 104.

The work range requirements of the energy absorption web 52 or other such energy absorbing structure housed within the energy absorbing web assembly 40 may illustratively be determined consistently with the example described with respect to FIGS. 1A and 1B. It will be understood, however, that in embodiments which include multiple energy absorbing web assemblies 40, the total work range requirements of all energy absorbing web assemblies 40, i.e., for the web restraint system $20^{IV}$, will be distributed among each individual energy absorbing web assembly 40, and the design and/or selection of the various energy absorption webs 52 or other such energy absorbing structures will take such distributed work range requirements into consideration.

It will be understood that any of the restraint systems 20, 20', 20", 20''', $20^{IV}$ illustrated in FIGS. 1A and 1B, 4A, 4B, 5A-5B and 6 respectively may include additional restraint webs and/or securement points, examples of which may include, but are not limited to, two or more leg restraint webs, one or more crotch webs, one or more additional torso restraint webs and/or one or more head and/or neck restraint webs. It will also be understood that the connection point(s) at the end(s) of any of the restraint webs included in any of the restraint systems 20, 20', 20", 20''', $20^{IV}$ may be different than that illustrated in attached figures. In some embodiments, for example, connected or attached ends of one or more of the various illustrated restraint webs may alternatively be coupled to the seat base 16, the seat back 14, the seat mounting base 17, the floor 18, another or additional frame component(s), and/or to a conventional web retractor or ratcheting device secured to any one or more such structures. Further still, any of the illustrated restraint systems 20, 20', 20", 20''', $20^{IV}$ in any of the above-described embodiments may additionally include one or more web guides mounted to the seat base 16, the seat back 14, the seat mounting base 17, the floor 18, another or additional frame component(s), wherein at least a portion of one or more restraint webs pass(es) through such one or more web guides.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, while the concepts of this disclosure have been described in the context of one or more energy absorbing web assemblies 40 mounted to or integral with one or more lap and/or shoulder webs, those skilled in the art will recognize that the energy absorption and/or visual deployment indication features described herein may be implemented in one or more other portions of a motor vehicle occupant restraint system. For example, the energy absorption and/or visual deployment indication features described herein may alternatively or additionally be implemented in one or more of a thigh, leg or foot restraint web assembly, a neck and/or head restraint web assembly, a helmet restraint web assembly, a suit restraint web assembly or the like.

What is claimed is:

1. An energy-absorbing restraint web assembly, comprising:
   a restraint web having a first end and a second end opposite the first end, and
   an energy absorption web having a first length, a first end attached to the restraint web at a first location thereof and a second end, opposite the first end of the energy absorption web, attached to the restraint web at a second location thereof, the energy absorption web responsive to a force applied to the restraint web, having a load component between the first and second ends of the restraint web, that is greater than a threshold force to elongate and absorb energy while elongating,
   wherein the restraint web defines a second length between the first and second locations thereof, the second length of the restraint web greater than the first length of the energy absorption web such that the overall length of the restraint web increases as the energy absorption web elongates,
   and wherein the restraint web is a shoulder web configured to extend across a torso of an occupant of a motor vehicle seat to restrain the occupant in and relative to the motor vehicle seat, and wherein the first end of the restraint web is configured for attachment to at least one of the motor vehicle seat, a frame component of a motor vehicle in which the motor vehicle seat is mounted, a floor of the motor vehicle in which the motor vehicle seat is mounted and a web retractor secured within the motor vehicle in which the motor vehicle seat is mounted, and the second end of the restraint web is configured for attachment to at least one of another restraint web and a releasable attachment device, and wherein the energy absorption web has a maximum elongation length, and wherein the restraint web assembly has an at rest state in which the occupant does not subject the restraint web to any forward forces, in a direction generally forwardly away from a front surface of a seat back of the motor vehicle seat, resulting from motion and/or impact of the motor vehicle in which the motor vehicle seat is mounted, and wherein the restraint web assembly has a fully deployed state in which the occupant subjects the restraint web to a forward force, in the direction generally forwardly away from the front surface of the seat back of the motor vehicle seat, resulting from motion and/or impact of the motor vehicle, that is greater than a threshold elongation force of the energy absorption web and to which the energy absorption web is responsive to elongate to the maximum elongation length, and wherein a first distance is defined between a point on the vehicle seat back and a point on the torso of the occupant when the restraint web assembly is in the at rest state, and wherein a second distance is defined between the point on the vehicle seat back and the point on the torso of the occupant when the restraint web assembly is in the fully deployed state, the second distance greater than the first distance, and wherein the maximum elongation length is selected to result in a difference between the first and second distances which allows the occupant's torso to reach dynamic equilibrium without submarining of the occupant relative to the restraint web assembly.

2. The energy-absorbing restraint web assembly of claim 1, further comprising a sleeve extending at least partially about the restraint web, the sleeve covering the energy absorption web as long as the energy absorption web is the first length.

3. The energy-absorbing restraint web assembly of claim 2, further comprising a visual deployment indicator on the restraint web, the visual deployment indicator covered by the sleeve as long as the energy absorption web is the first length, the visual deployment indicator extending outwardly from the sleeve as the energy absorption web elongates from the first length toward a second length of the energy absorption web that is longer than the first length of the energy absorption web.

4. The energy-absorbing restraint web assembly of claim 3, wherein the visual deployment indicator comprises a patch affixed to the restraint web.

5. The energy-absorbing restraint web assembly of claim 4, wherein the patch includes at least one of text, at least one graphic element and a color code to provide notification that the energy-absorbing restraint web assembly has been deployed when the visual deployment indicator extends outwardly from the sleeve.

6. The energy-absorbing restraint web assembly of claim 3, wherein the visual deployment indicator comprises on a portion of the restraint web at least one of text, at least one graphic element and a color code to provide notification that the energy-absorbing restraint web assembly has been deployed when the visual deployment indicator extends outwardly from the sleeve.

7. The energy-absorbing restraint web assembly of claim 1, wherein the maximum elongation length of the energy absorption web is equal to the second length of the restraint web.

8. The energy-absorbing restraint web assembly of claim 1, wherein the maximum elongation length of the energy absorption web is greater than the first length thereof but less than the second length of the restraint web.

9. The energy-absorbing restraint web assembly of claim 1, wherein the maximum elongation length of the energy absorption web is greater than the second length of the restraint web.

10. The energy-absorbing restraint web assembly of claim 1, wherein
the energy absorption web performs an amount of work when elongating from the first length thereof to the maximum elongation length,
and wherein the amount of work performed by the energy absorption web is in a work range of about 20 inch-lbs-350 inch-lbs.

11. The energy-absorbing restraint web assembly of claim 1, wherein the energy absorption web has an elongation rate associated therewith,
and wherein the energy absorption web performs an amount of work when elongating from the first length thereof to the maximum elongation length,
and wherein the amount of work performed by the energy absorption web is a function of the elongation rate, an elongation length for a relatively small occupant of the motor vehicle seat and an elongation length for a relatively large occupant of the motor vehicle seat.

12. The energy-absorbing restraint web assembly of claim 1, wherein the difference between the first and second distances is between about 2.5 centimeters and 10 centimeters.

* * * * *